(12) United States Patent
Tsuji

(10) Patent No.: US 11,654,718 B2
(45) Date of Patent: May 23, 2023

(54) NON-PNEUMATIC TIRE

(71) Applicant: Toyo Tire Corporation, Itami (JP)

(72) Inventor: Noriyuki Tsuji, Itami (JP)

(73) Assignee: TOYO TIRE CORPORATION, Itami (JP)

(*) Notice: Subject to any disclaimer, the term of this patent is extended or adjusted under 35 U.S.C. 154(b) by 200 days.

(21) Appl. No.: 17/002,903

(22) Filed: Aug. 26, 2020

(65) Prior Publication Data

US 2021/0070103 A1 Mar. 11, 2021

(30) Foreign Application Priority Data

Sep. 6, 2019 (JP) ............... JP2019-162968

(51) Int. Cl.
B60C 7/18 (2006.01)
B60C 7/22 (2006.01)
B60C 7/14 (2006.01)

(52) U.S. Cl.
CPC ............... B60C 7/22 (2013.01); B60C 7/146 (2021.08); B60C 7/18 (2013.01)

(58) Field of Classification Search
CPC ........... B60C 7/18; B60C 7/146; B60C 7/107; B60C 7/102; B60C 7/22
See application file for complete search history.

(56) References Cited

U.S. PATENT DOCUMENTS

2010/0200131 A1* 8/2010 Iwase .................. B60C 7/22
152/209.1
2014/0311642 A1 10/2014 Nagayoshi
2017/0157984 A1* 6/2017 Van Riper ............ B60C 7/18
2017/0297372 A1* 10/2017 Talbot .................. B60C 7/22
(Continued)

FOREIGN PATENT DOCUMENTS

| CN | 103813913 A | 5/2014 |
| CN | 107405953 A | 11/2017 |
| EP | 3000619 A1 | 3/2016 |

(Continued)

OTHER PUBLICATIONS

Extended European Search Report dated Dec. 7, 2020, issued in counterpart EP Application No. 20192952.8 (9 pages).
(Continued)

Primary Examiner — Kip T Kotter
(74) Attorney, Agent, or Firm — WHDA, LLP

(57) ABSTRACT

A non-pneumatic tire includes: an inner annular portion; an outer annular portion; a plurality of coupling portions which couple the inner annular portion and the outer annular portion to each other and are provided independently of one another in a tire circumferential direction; at least one annular overall reinforcing layer embedded entirely in the outer annular portion in a tire width direction; and at least one annular partial reinforcing layer embedded only in a part of the outer annular portion in the tire width direction, wherein the outer annular portion includes a connecting region to which the plurality of coupling portions are connected, and a non-connecting region to which the plurality of coupling portions are not connected, in the tire width direction, and wherein the partial reinforcing layer overlaps the non-connecting region in a tire radial direction when viewed from the tire circumferential direction.

5 Claims, 5 Drawing Sheets

(56) References Cited

U.S. PATENT DOCUMENTS

2018/0086142 A1   3/2018  Hasegawa et al.
2019/0016077 A1*  1/2019  Wilson .................. B60B 9/10

FOREIGN PATENT DOCUMENTS

| EP | 3159184 A1 | 4/2017 |
| --- | --- | --- |
| EP | 3159187 A1 | 4/2017 |
| EP | 3275696 A1 | 1/2018 |
| JP | 2015-39986 A | 3/2015 |
| JP | 2016179731 A | 10/2016 |

OTHER PUBLICATIONS

Office Action dated May 23, 2022, issued in counterpart CN Application No. 202010815925.7, with English Translation. (14 pages).

Office Action dated Nov. 18, 2022, issued in counterpart CN application No. 202010815925.7, with English translation. (12 pages).

Office Action dated Apr. 13, 2023, issued in counterpart JP application No. 2019-162968 with English translation. (3 pages).

* cited by examiner

NON-PNEUMATIC TIRE

BACKGROUND OF THE INVENTION

Field of the Invention

The present invention relates to a non-pneumatic tire.

Description of the Related Art

As a conventional non-pneumatic tire, for example, Patent Document 1 discloses a non-pneumatic tire including: an inner annular portion; an outer annular portion provided concentrically on an outer side of the inner annular portion; and a plurality of coupling portions which couple the inner annular portion and the outer annular portion to each other and are provided independently of one another in a tire circumferential direction.

Depending on the shape of the coupling portion, the outer annular portion includes connecting regions to which a plurality of coupling portions are connected, and non-connecting regions to which the plurality of coupling portions are not connected, in the tire width direction. At this time, the non-connecting regions of the outer annular portion are easily deformed by centrifugal force, resulting in poor durability.

PRIOR ART DOCUMENT

Patent Document

Patent Document 1: JP-A-2015-39986

SUMMARY OF THE INVENTION

Accordingly, it is an object of the present invention to provide a non-pneumatic tire capable of suppressing the deformation by the centrifugal force in the non-connecting regions of the outer annular portion to which the coupling portions are not connected.

A non-pneumatic tire of the present invention includes: an inner annular portion; an outer annular portion provided concentrically on an outer side of the inner annular portion; a plurality of coupling portions which couple the inner annular portion and the outer annular portion to each other and are provided independently of one another in a tire circumferential direction; at least one annular overall reinforcing layer embedded entirely in the outer annular portion in a tire width direction; and at least one annular partial reinforcing layers embedded only in a part of the outer annular portion in the tire width direction, wherein the outer annular portion includes a connecting region to which the plurality of coupling portions are connected, and a non-connecting region to which the plurality of coupling portions are not connected, in the tire width direction, and wherein the partial reinforcing layer overlaps the non-connecting region in a tire radial direction when viewed from the tire circumferential direction.

Moreover, in the non-pneumatic tire according to the present invention, the partial reinforcing layer may overlap the non-connecting region by 80% or more of a width of the non-connecting region.

Further, in the non-pneumatic tire according to the present invention, an end portion of the partial reinforcing layer in the tire width direction may be located in the connecting region.

Moreover, in the non-pneumatic tire according to the present invention, the partial reinforcing layer may be disposed outside the overall reinforcing layer in the tire radial direction.

Further, in the non-pneumatic tire according to the present invention, a plurality of the overall reinforcing layers may be provided, and the partial reinforcing layer may be disposed between the plurality of the overall reinforcing layers.

Moreover, in the non-pneumatic tire according to the present invention, the partial reinforcing layer may be composed of reinforcing fibers, and the reinforcing fibers may be arrayed in a direction inclined by 0 to 45° with respect to the tire circumferential direction.

According to the non-pneumatic tire of the present invention, such non-connecting regions are reinforced by the partial reinforcing layers, whereby the deformation in the non-connecting regions of the outer annular portion by the centrifugal force can be suppressed.

DETAILED DESCRIPTION OF THE PREFERRED EMBODIMENTS

Figure 1:
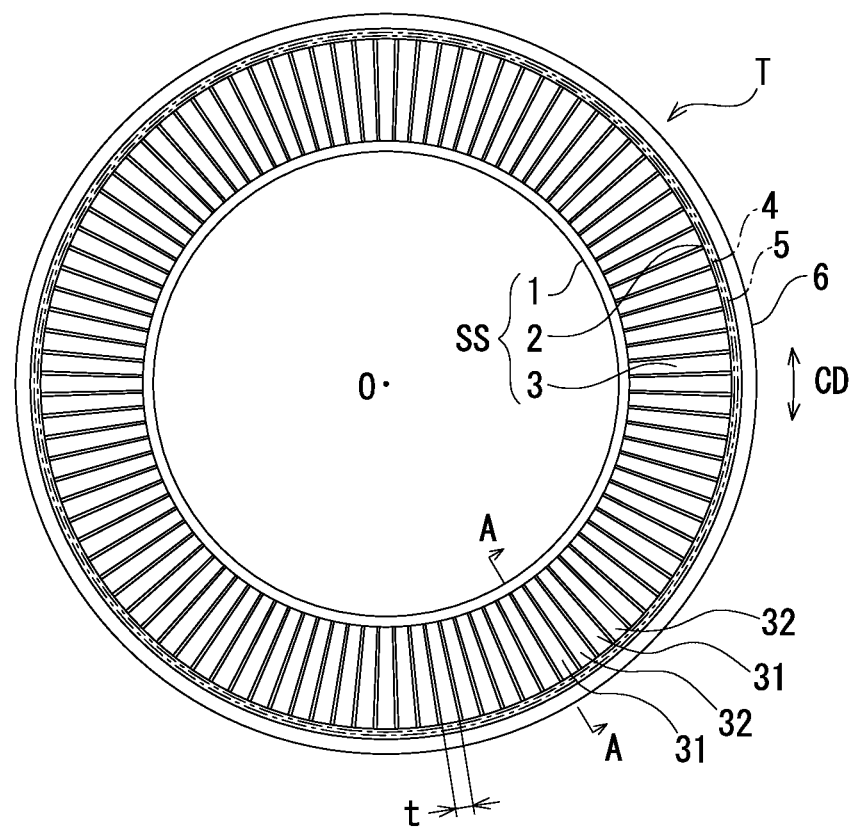
FIG. 1 is a front view showing an example of a non-pneumatic tire of the present invention.
Figure 2:
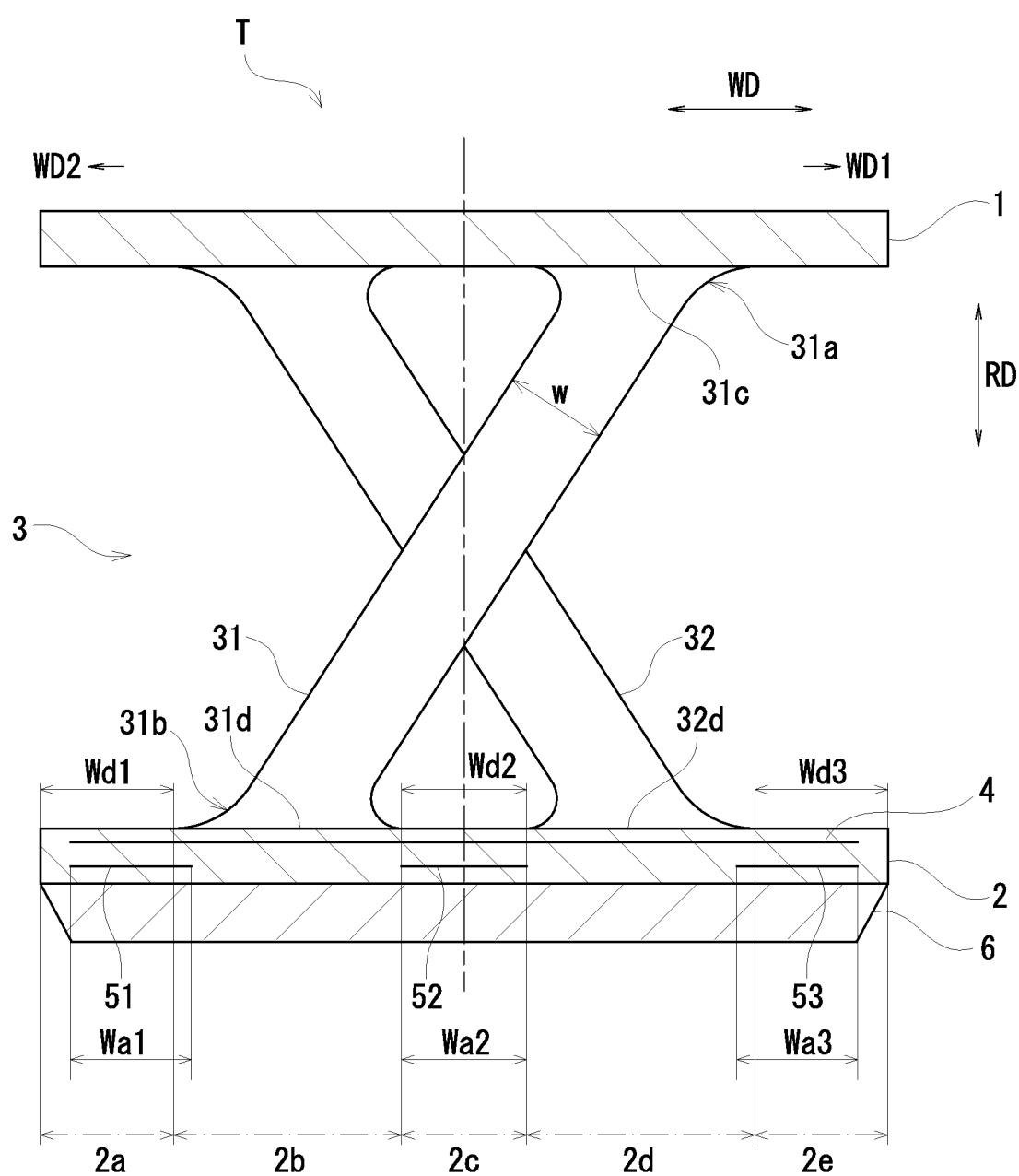
FIG. 2 is a cross-sectional view taken along a line A-A of the non-pneumatic tire of FIG. 1.

Hereinafter, an embodiment of a non-pneumatic tire will be described with reference to the drawings. FIG. 1 is a front view showing an example of a non-pneumatic tire T. FIG. 2 is a cross-sectional view taken along a line A-A of FIG. 1. Here, reference symbol O denotes an axis.

The non-pneumatic tire T includes a support structure SS for supporting a load from a vehicle. The non-pneumatic tire T of the present invention just needs to include such a support structure SS as described above. A member corresponding to a tread, a reinforcing layer, members for accommodation to an axle and a rim, or the like may be provided on an outer side (outer circumference side) and an inner side (inner circumference side) of the support structure SS.

In this embodiment, as shown in FIG. 1, there is shown an example in which a tread 6 is provided outside the support structure SS. The tread 6 is made of, for example, rubber, resin, or the like as in the conventional pneumatic tire, and may include a pattern (groove) on an outer circumferential surface thereof as in the conventional pneumatic tire.

As shown in the front view of FIG. 1, in the non-pneumatic tire T of this embodiment, the support structure SS includes: an inner annular portion 1; an outer annular portion 2 provided concentrically on an outer side of the inner annular portion 1; and a plurality of coupling portions 3 which couple the inner annular portion 1 and the outer annular portion 2 to each other and are provided independently of one another in a tire circumferential direction CD.

The support structure SS in the present invention is formed of an elastic material. From a viewpoint of enabling integral molding at the time of manufacturing the support structure SS, it is preferable that the inner annular portion 1, the outer annular portion 2, and the coupling portion 3 be basically made of the same material except a reinforcing structure. Moreover, for example, as a base material of the support structure SS, there may be adopted a thermoplastic elastomer such as polyester elastomer, a crosslinked rubber such as natural rubber, or other resins (for example, a thermoplastic resin such as polyethylene resin, and a thermosetting resin such as polyurethane resin). Furthermore, for example, a reinforcing material such as a fiber or a metal cord may be embedded inside the base material.

From a viewpoint of improving uniformity, it is preferable that the inner annular portion 1 have a cylindrical shape with a constant thickness. Moreover, on an inner circumferential surface of the inner annular portion 1, it is preferable to provide irregularities and the like for maintaining fitting property in order to mount the non-pneumatic tire T to the axle and the rim. Note that, though the thickness of the inner annular portion 1 is not particularly limited, the thickness is appropriately set from viewpoints of reducing a weight and improving a durability while sufficiently transmitting force to the coupling portion 3.

Although an inner diameter of the inner annular portion 1 is not particularly limited, the inner diameter is appropriately determined according to dimensions of the rim and the axle on which the non-pneumatic tire T is to be mounted, and the like. Although a width of the inner annular portion 1 in a tire width direction is not particularly limited, the width is appropriately determined depending on a purpose, a length of the axle, and the like.

From the viewpoint of improving the uniformity, it is preferable that the outer annular portion 2 have a cylindrical shape with a constant thickness. Note that, though the thickness of the outer annular portion 2 is not particularly limited, the thickness is appropriately set from the viewpoints of reducing the weight and improving the durability while sufficiently transmitting force from the coupling portion 3.

Although an inner diameter of the outer annular portion 2 is not particularly limited, the inner diameter is appropriately determined depending on the purpose and the like. Moreover, though a width of the outer annular portion 2 in the tire width direction is not particularly limited, the width is appropriately determined depending on the purpose and the like. Note that, preferably, the width of the outer annular portion 2 is the same as the width of the inner annular portion 1.

In the outer annular portion 2, at least one annular overall reinforcing layer 4 is embedded entirely in the outer annular portion 2 in the tire width direction WD. In this embodiment, one overall reinforcing layer 4 is provided. Note that the overall reinforcing layer 4 just needs to be disposed in substantially the whole of the outer annular portion 2 in the tire width direction WD, and does not need to completely reach both ends of the outer annular portion 2 in the tire width direction WD as shown in FIG. 2.

The overall reinforcing layer 4 includes at least reinforcing fibers arrayed in a tire circumferential direction CD. Moreover, the overall reinforcing layer 4 may further include reinforcing fibers arrayed in the tire width direction WD, and may include a woven fabric composed of reinforcing fibers arrayed in the tire circumferential direction CD and reinforcing fibers arrayed in the tire width direction WD.

Moreover, in the outer annular portion 2, annular partial reinforcing layers 5 are embedded only in a part of the outer annular portion 2 in the tire width direction WD. The partial reinforcing layers 5 are disposed outside the overall reinforcing layer 4 in a tire radial direction RD. In the example of FIG. 2, partial reinforcing layers 51,52 and 53 are provided side by side in the tire width direction WD.

The partial reinforcing layers 5 are composed of reinforcing fibers arrayed in a direction inclined by 0 to 45° with respect to the tire circumferential direction CD. The partial reinforcing layers 5 are preferably composed of reinforcing fibers arrayed in a direction inclined by 0 to 30° with respect to the tire circumferential direction CD. The partial reinforcing layers 5 may be composed of two layers of reinforcing fibers arrayed in directions inclined to opposite sides to each other with respect to the tire circumferential direction CD.

The coupling portions 3 couple the inner annular portion 1 and the outer annular portion 2 to each other. A plurality of the coupling portions 3 are provided so as to be independent of one another in the tire circumferential direction CD by placing appropriate intervals between the coupling portions 3. Although the number of coupling portions 3 is not particularly limited, the number is appropriately set from viewpoints of reducing the weight, improving power transmission, and improving the durability while sufficiently supporting the load from the vehicle.

The plurality of coupling portions 3 are configured such that first coupling portions 31 and second coupling portions 32 are arrayed along the tire circumferential direction CD. In this case, it is preferable that the first coupling portions 31 and the second coupling portions 32 be arrayed alternately with each other along the tire circumferential direction CD. This makes it possible to further reduce dispersion of the ground contact pressure during tire rolling.

From the viewpoint of improving the uniformity, it is preferable that a pitch in the tire circumferential direction CD between the first coupling portions 31 and the second coupling portions 32 be set constant.

Each of the first coupling portions 31 is extended from one side WD1 in the tire width direction of the inner annular portion 1 toward other side WD2 in the tire width direction of the outer annular portion 2. Meanwhile, each of the second coupling portions 32 is extended from the other side WD2 in the tire width direction of the inner annular portion 1 toward the one side WD1 in the tire width direction of the outer annular portion 2. That is, the first coupling portion 31 and the second coupling portion 32, which are adjacent to each other, are disposed in a substantially X shape when viewed from the tire circumferential direction CD.

The first coupling portion 31 and the second coupling portion 32 when viewed from the tire circumferential direction CD are preferably symmetric to each other with respect to a tire equatorial plane as shown in FIG. 2. Therefore, hereinafter, the first coupling portion 31 will mainly be described.

The first coupling portion 31 has an elongated plate-like shape extending from the inner annular portion 1 to the outer annular portion 2. In the first coupling portion 31, a plate thickness t is smaller than a plate width w, and a plate thickness direction is oriented to the tire circumferential direction CD. That is, the first coupling portion 31 has a plate shape extending in the tire radial direction RD and in the tire width direction WD. The first coupling portion 31 and the second coupling portion 32 are formed into such an elongated plate shape. In this way, even if the plate thickness t is reduced, the first coupling portion 31 and the second coupling portion 32 can obtain desired rigidity by setting the plate width w to be wide. Therefore, the durability can be improved. Moreover, the number of first coupling portions 31 and the number of second coupling portions 32 are increased while thinning the plate thickness t. In this way, gaps between the coupling portions adjacent to one another in the tire circumferential direction CD can be reduced while maintaining the rigidity of the entire tire. Therefore, the dispersion of the ground contact pressure during the tire rolling can be reduced.

Although the thickness t is not particularly limited, the thickness t is appropriately set from the viewpoints of reducing the weight and improving the durability while sufficiently transmitting force from the inner annular portions 1 and the outer annular portions 2. Although the plate width W is not particularly limited, the plate width w is appropriately set from the viewpoints of reducing the weight and improving the durability while sufficiently transmitting force from the inner annular portions 1 and the outer annular portions 2.

Preferably, the first coupling portion 31 has reinforcing portions 31a and 31b, in which a plate width gradually increases toward the inner annular portion 1 or the outer annular portion 2, in a vicinity of a connecting portion with the inner annular portion 1 and in a vicinity of a connecting portion with the outer annular portion 2.

The first coupling portion 31 includes an inner connecting portion 31c connected to the inner annular portion 1 and an outer connecting portion 31d connected to the outer annular portion 2. The inner connecting portion 31c is a portion where the reinforcing portion 31a is connected to the inner annular portion 1. Moreover, the outer connecting portion 31d is a portion where the reinforcing portion 31b is connected to the outer annular portion 2.

Although a shape of the inner connecting portion 31c is not particularly limited, the inner connecting portion 31c is formed to be elongated in this embodiment. Specifically, the inner connecting portion 31c is formed into a rectangular shape. A longitudinal direction of the inner connecting portion 31c is parallel to the tire width direction WD. Note that a longitudinal direction of the inner connecting portion 31c does not have to be parallel to the tire width direction WD, and for example, may intersect the tire width direction WD.

Although a shape of the outer connecting portion 31d is not particularly limited, the outer connecting portion 31d is formed to be elongated in this embodiment. Specifically, the outer connecting portion 31d is formed into a rectangular shape. A longitudinal direction of the outer connecting portion 31d is parallel to the tire width direction WD. Note that a longitudinal direction of the outer connecting portion 31d does not have to be parallel to the tire width direction WD, and for example, may intersect the tire width direction WD.

The outer annular portion 2 includes connecting regions 2b and 2d to which the plurality of coupling portions 3 are connected in a tire width direction WD, and non-connecting regions 2a, 2c and 2e to which the plurality of coupling portions 3 are not connected in the tire width direction WD. Each of the connecting regions 2b and 2d and the non-connecting regions 2a, 2c and 2e has an annular shape. The outer connecting portion 31d of the first coupling portion 31 is present only in the connecting region 2b, and the outer connecting portion 32d of the second coupling portion 32 is present only in the connecting region 2d. The outer connecting portion 31d and the outer connecting portion 32d are not present in the non-connecting regions 2a, 2c and 2e.

The partial reinforcing layers 51, 52 and 53 embedded in the outer annular portion 2 overlap the non-connecting regions 2a, 2c and 2e in the tire radial direction RD when viewed from the tire circumferential direction CD. With this configuration, the non-connecting regions 2a, 2c and 2e are reinforced (tightened) by the partial reinforcing layers 51, 52 and 53, whereby the deformation of the outer annular portion 2 in the non-connecting regions 2a, 2c and 2e can be suppressed. Thus, a deformation difference between the non-connecting regions 2a, 2c and 2e and the connecting regions 2b and 2d can be suppressed. Note that, in this specification, "overlapping" includes not only entire overlapping but also partial overlapping.

The partial reinforcing layers 51, 52 and 53 overlap the non-connecting regions 2a, 2c and 2e by 80% or more of widths of the non-connecting regions 2a, 2c and 2e. That is, the overlapping between the partial reinforcing layer 51 and the non-connecting region 2a is 80% or more of a width Wd1 of the non-connecting region 2a, the overlapping between the partial reinforcing layer 52 and the non-connecting region 2c is 80% or more of a width Wd2 of the non-connecting region 2c, and the overlapping between the partial reinforcing layer 53 and the non-connecting region 2e is 80% or more of a width Wd3 of the non-connecting region 2e.

Moreover, preferably, end portions of the partial reinforcing layers 51, 52 and 53 in the tire width direction are located in the connecting regions 2b and 2d. In the example of FIG. 2, one end portion of the partial reinforcing layer 51 is located in the connecting region 2b, and one end portion of the partial reinforcing layer 53 is located in the connecting region 2d. This is because there is no connecting region at both end portions of the outer annular portion 2 in the tire width direction WD, and the non-connecting regions 2a and 2e are likely to be deformed by the centrifugal force, so that the widths of the partial reinforcing layers 51 and 53 are made wider to suppress the deformation of the non-connecting regions 2a and 2e.

The widths of the partial reinforcing layers 51, 52 and 53 are appropriately set depending on a width and shape of the coupling portion 3 since ranges to be reinforced vary depending on the widths of the non-connecting regions 2a, 2c and 2e. Such a width Wa1 of the partial reinforcing layer 51 is, for example, 80 to 150% of the width Wd1 of the non-connecting region 2a. Such a width Wa2 of the partial reinforcing layer 52 is, for example, 80 to 150% of the width Wd2 of the non-connecting region 2c. Such a width Wa3 of the partial reinforcing layer 53 is, for example, 80 to 150% of the width Wd3 of the non-connecting region 2e.

Figure 3:
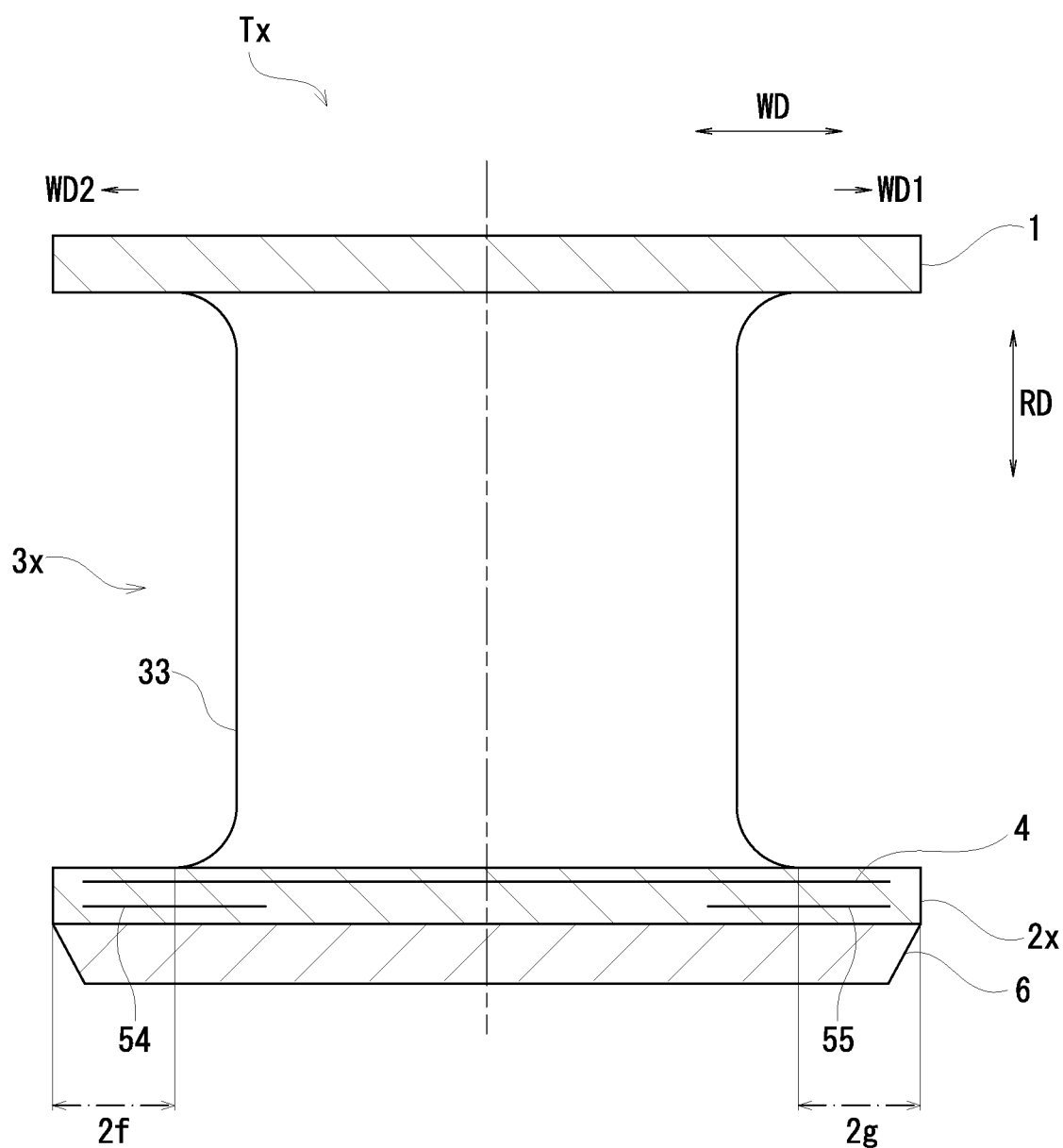
FIG. 3 is a cross-sectional view of a non-pneumatic tire according to another embodiment.

OTHER EMBODIMENTS (1) The shape of the coupling portion 3 is not limited to the shapes of the first coupling portion 31 and the second coupling portion 32, which are mentioned above. In an example shown in FIG. 3, a coupling portion 3x for a non-pneumatic tire Tx has a substantially rectangular plate shape. The coupling portion 33 couples a central portion of the inner annular portion 1 in the tire width direction WD and a central portion of the outer annular portion 2x in the tire width direction WD. Partial reinforcing layers 54 and 55 overlap non-connecting regions 2f and 2g in the tire radial direction RD when viewed from the tire circumferential direction CD.

Figure 4:
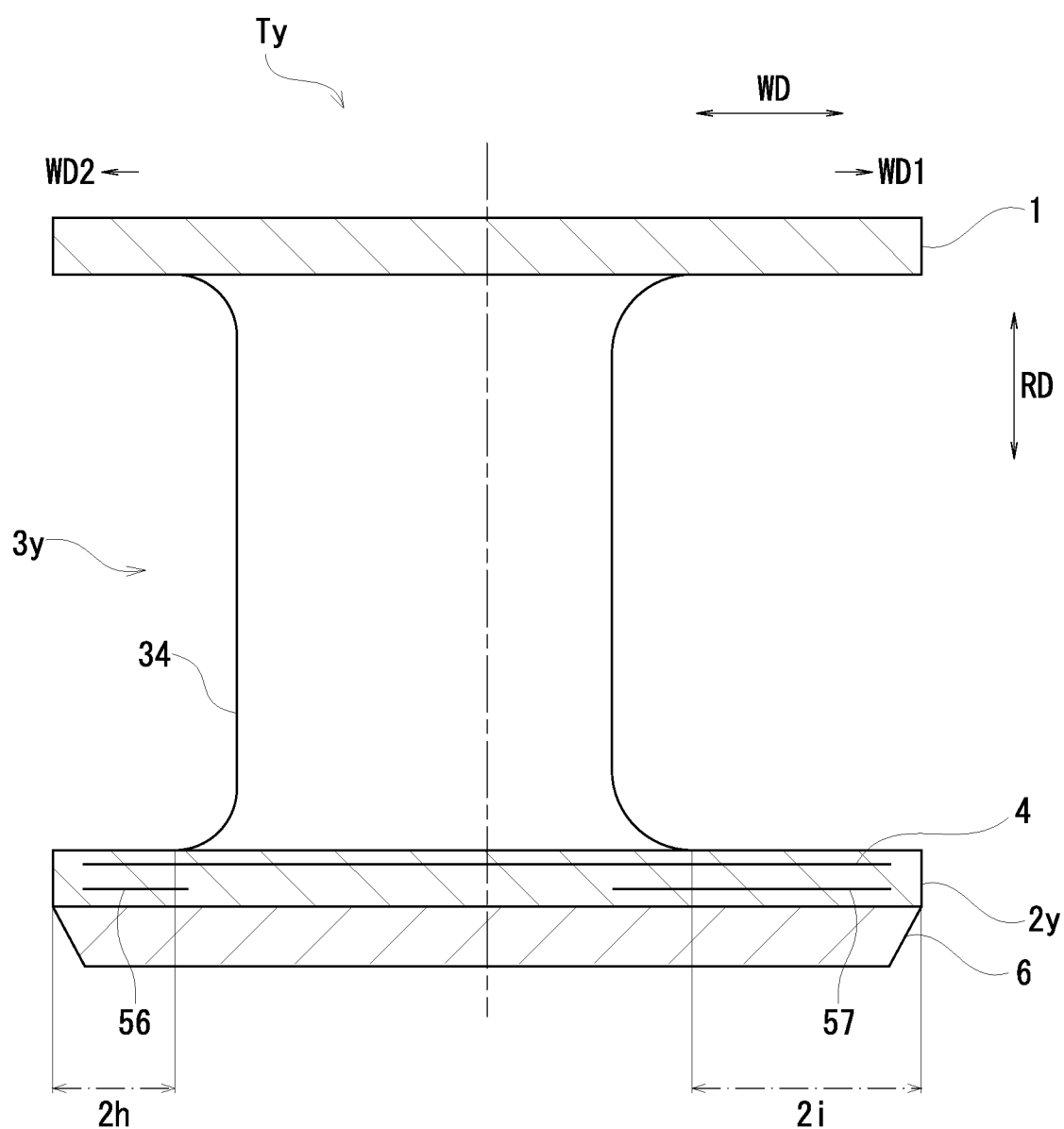
FIG. 4 is a cross-sectional view of a non-pneumatic tire according to another embodiment.

(2) In an example shown in FIG. 4, a coupling portion 3y for a non-pneumatic tire Ty has a substantially rectangular plate shape. The coupling portion 34 couples a central portion of the inner annular portion 1 in the tire width direction WD and a central portion of the outer annular portion 2y in the tire width direction WD. However, in this example, the center of the coupling portion 34 is shifted from the tire equatorial plane to the other side WD2 in the tire width direction. Partial reinforcing layers 56 and 57 overlap non-connecting regions 2*h* and 2*i* in the tire radial direction RD when viewed from the tire circumferential direction CD. In this example, since a width of the non-connecting region 2*i* is wider than a width of the non-connecting region 2*h*, a width of the partial reinforcing layer 57 is also set wider than a width of the partial reinforcing layer 56.

Figure 5:
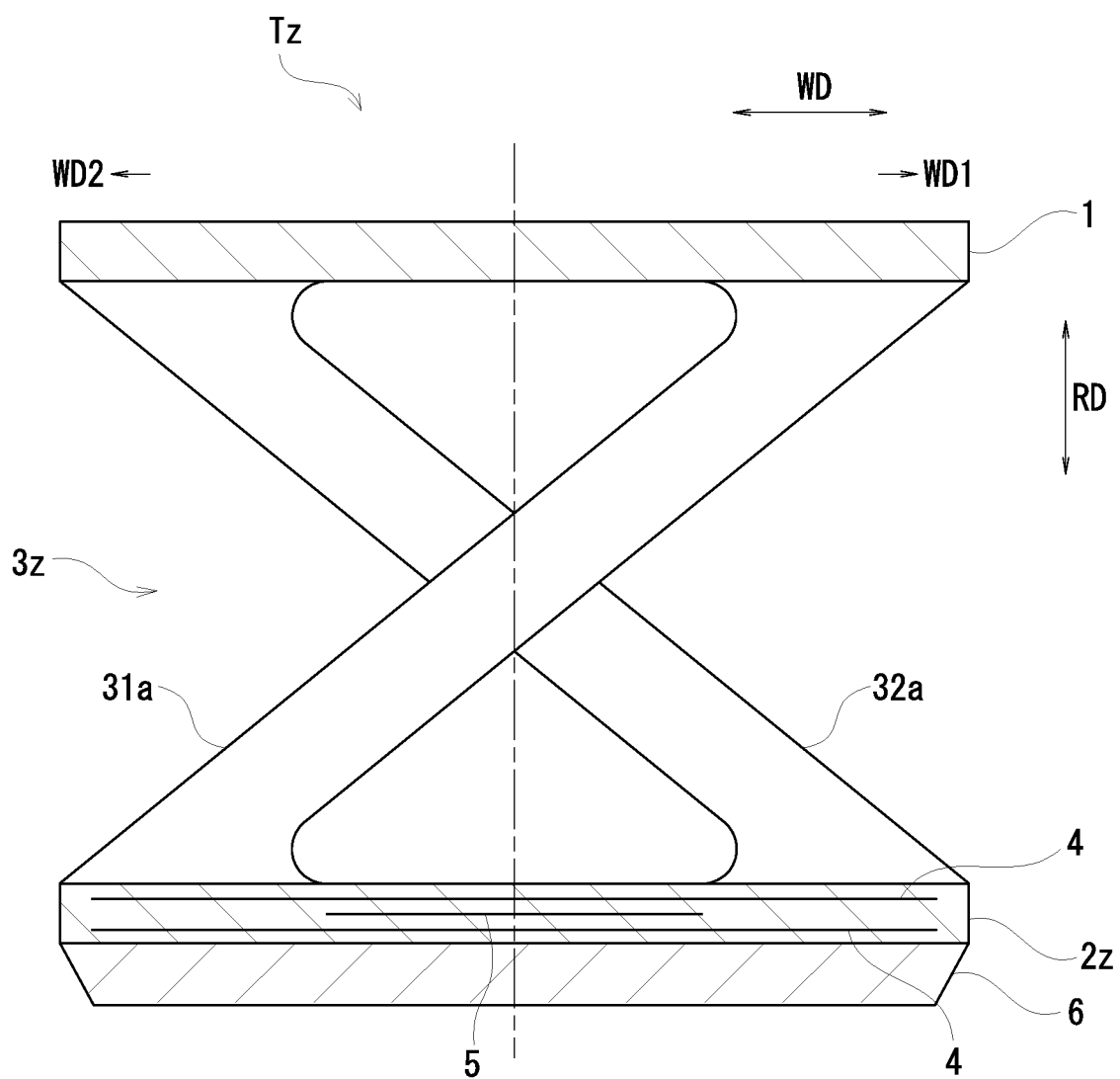
FIG. 5 is a cross-sectional view of a non-pneumatic tire according to another embodiment.

(3) In the above-mentioned embodiment, only one layer is provided as the overall reinforcing layer 4, but a plurality of layers may be provided. In an example shown in FIG. 5, two overall reinforcing layers 4 are provided for a non-pneumatic tire Tz having a coupling portion 3*z* that couples the inner annular portion 1 and an outer annular portion 2*z* to each other. When a plurality of the overall reinforcing layers 4 are provided, preferably, the partial reinforcing layer 5 is disposed outside the overall reinforcing layer 4 as an innermost layer in the tire radial direction RD, and is disposed inside the overall reinforcing layer 4 as an outermost layer in the tire radial direction RD. That is, the partial reinforcing layer 5 is preferably disposed between the plurality of overall reinforcing layers 4. However, the partial reinforcing layer 5 may be disposed outside the plurality of overall reinforcing layer 4 in the tire radial direction RD. In an example of FIG. 5, the partial reinforcing layer 5 may be disposed outside the two overall reinforcing layers 4 in the tire radial direction RD.

(4) In the above-mentioned embodiment, the outer connecting portions (the outer connecting portion 31*d*, the outer connecting portion 32*d* and the like) are disposed in the tire circumferential direction CD without changing positions thereof in the tire width direction WD, but the invention is not limited to this. The outer connecting portions may be disposed in the tire circumferential direction CD while changing the positions thereof in the tire width direction WD. At this time, the non-connecting regions are set as regions which do not include all the outer connecting portions when viewed from the tire circumferential direction CD.

What is claimed is:

1. A non-pneumatic tire comprising: an inner annular portion; an outer annular portion provided concentrically on an outer side of the inner annular portion;
    a plurality of coupling portions which couple the inner annular portion and the outer annular portion to each other and are provided independently of one another in a tire circumferential direction;
    at least one annular overall reinforcing layer embedded entirely in the outer annular portion in a tire width direction; and
    at least one annular partial reinforcing layer embedded only in a part of the outer annular portion in the tire width direction,
    wherein the outer annular portion includes an annular connecting region to which the plurality of coupling portions are connected, and an annular non-connecting region to which the plurality of coupling portions are not connected, in the tire width direction,
    wherein the partial reinforcing layer overlaps the non-connecting region in a tire radial direction when viewed from the tire circumferential direction, and
    wherein a plurality of the overall reinforcing layers are provided, and the partial reinforcing layer is disposed between the plurality of overall reinforcing layers.

2. The non-pneumatic tire according to claim 1, wherein the partial reinforcing layer overlaps the non-connecting region by 80% or more of a width of the non-connecting region.

3. The non-pneumatic tire according to claim 1, wherein an end portion of the partial reinforcing layer in the tire width direction is located in the connecting region.

4. The non-pneumatic tire according to claim 1, wherein the partial reinforcing layer is composed of reinforcing fibers, and the reinforcing fibers are arrayed in a direction inclined by 0 to 45° with respect to the tire circumferential direction.

5. The non-pneumatic tire according to claim 1, wherein a width of the partial reinforcing layer in the tire width direction is 80 to 150% of a width of the non-connecting region in the tire width direction.

* * * * *